No. 11,808. Reissued Feb. 6, 1900.

R. T. HARGROVES.

BARREL.

(Application filed Nov. 23, 1899.)

Witnesses

Geo. S. Dondero

H. J. Burkhart

Robert T. Hargroves, Inventor

By his Attorneys,

C. A. Snow & Co.

THE NORRIS PETERS CO., PHOTO-LITHO., WASHINGTON, D. C.

UNITED STATES PATENT OFFICE.

ROBERT TATEM HARGROVES, OF CHURCHLAND, VIRGINIA.

BARREL.

SPECIFICATION forming part of Reissued Letters Patent No. 11,808, dated February 6, 1900.

Original No. 619,686, dated February 14, 1899. Application for reissue filed November 23, 1899. Serial No. 738,116.

*To all whom it may concern:*

Be it known that I, ROBERT TATEM HARGROVES, residing at Churchland, in the county of Norfolk and State of Virginia, have made certain new and useful Improvements in Barrels, of which the following is a specification.

My invention is an improvement in barrels, and particularly in that class of barrels known as "ventilated" barrels and which are especially designed for carrying garden-truck and the like.

The invention has for objects, among others, to provide a barrel in which each stave will reinforce the other, will afford ample ventilation, in which the greatest strength will be furnished at the ends of the barrel where necessary, the staves of which are so formed as to facilitate the formation of the bilge without weakening the staves, and in which the shape of the staves is such as to render their production from veneer sheets economical by avoiding any waste of material.

The invention consists in certain novel constructions and combinations of parts, as will be hereinafter described, and pointed out in the claims.

Figure 2:
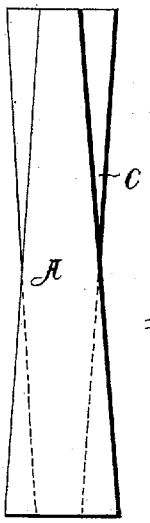
Figure 1:
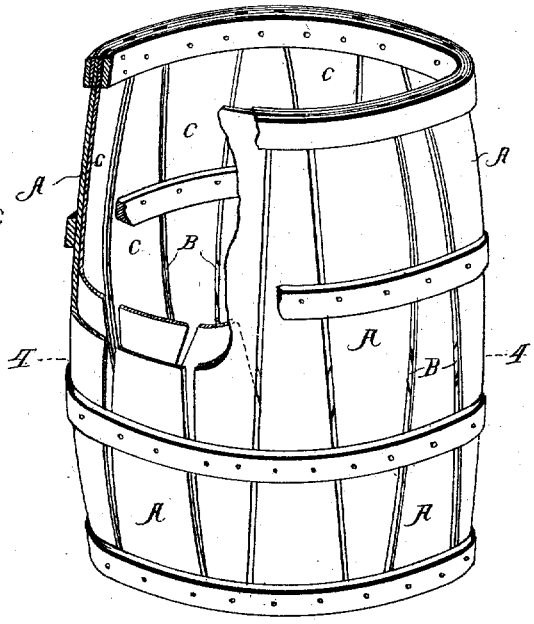
Figure 3:
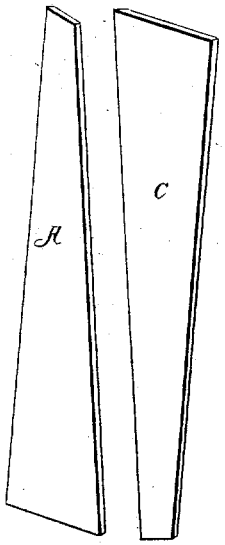
Figure 4:
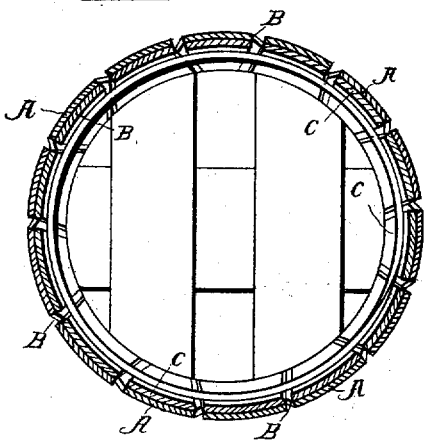

In the drawings, Figure 1 is a perspective view of my barrel, parts being broken away and others shown in section. Fig. 2 is a detail face view of one of the composite staves. Fig. 3 is a perspective view showing the sections of such composite staves detached. Fig. 4 is a cross-sectional view on about line 4 4 of Fig. 1; and Fig. 5 is a face view of the veneer blank, illustrating the production of the staves.

In the manufacture of barrels the wider the staves at the ends of the barrel the greater the rigidity of the barrel, and if the barrel could be made of a solid sheet without any ventilation and with the necessary bilge it would attain the greatest strength, its strength being limited only by the thickness of the material. It will be seen, therefore, that barrels increase in strength with the width of the staves at the end, provided the increase of strength is not lost in means of ventilation. Where the staves are the same width from end to end it is impracticable to make them more than about three inches wide, because the curvature at the end is that necessary for a seventeen-inch circle, while the curvature at the bilge-hoop is that of nineteen inches, such variation of curvature giving the staves a tendency to pucker. For instance, if a wide stave of even width be put into the barrel having a seventeen-inch circle at the end and a nineteen-inch circle at the quarter-hoop the variation in curvature will put a tension on the stave at its weakest point, while if the width of the stave at the larger circle be lessened it will more readily partake of the direction of the larger circle without any injurious tension and the latent strength of the stave will be preserved, thus maintaining the rigidity of the barrel when completed.

Figure 5:
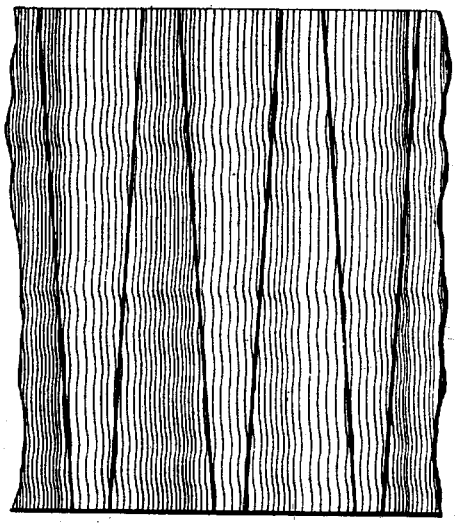

In carrying out my invention I make the staves wedge shape, tapering gradually from their wider toward their opposite end, and make the staves uniform in shape and size, as will be understood from Fig. 5, from which it will be seen the staves are formed from the blank of veneer without any loss of material whatever.

In forming the barrels the staves A are arranged alongside each other and reversed end to end, whereby the narrow end of each stave lies next to the wide end of the adjacent stave, thus preserving at each end of the barrel staves of the extreme width whose wide ends alternate with the narrow ends of the adjacent staves. By this construction the staves A narrow from one toward their other ends, so there is a decrease in the width of the staves from the wide to their opposite ends, which facilitates the production of the bilge and enables the proper formation of the barrel without any injurious tension upon the staves. At the same time the arrangement of the staves A, united with the end hoops and the bilge-hoops, produces a ventilating-opening B at the middle or bilge of the barrel between the adjacent staves. In practice the staves may be secured to the end hoop and quarter-hoops in any desired manner.

While the construction of barrels as before described may give good results, it is preferred to arrange the staves in two series, an outer series of the staves A and an inner series of staves C, the staves A and C being secured together, but reversed end to end, and producing a series of composite staves, one of which is illustrated in Fig. 3. This composite stave is composed of an outer stave A and an inner stave C, such staves being reversed end to end and fitted face to face together, the barrel when thus formed consisting, as shown in Fig. 1, of a double series of stave-sections, one lying within the other. By thus doubling the stave-sections and alternating them end for end, with the wide end of one section of the composite stave at one end of the barrel and the wide end of the other section of such stave at the opposite end of the barrel and with the same arrangement in the adjacent composite stave, I attain the greatest possible strength in a truck-barrel and afford at the same time ample ventilation.

In manufacturing the staves they are cut from veneer strips in which the grain runs transversely, so such grain will extend in the direction of length of the staves, and the composite staves are formed by arranging similar staves face to face and reversed end to end, with the center perpendicular line of one layer or section directly over that of the other section of the composite stave.

In the construction of ventilated barrels it is highly important to secure strength and rigidity of the structure, together with the necessary bilge and the spaces or openings for the circulation of the air. Although my invention as heretofore set forth may be embodied in a barrel using one series of stave-sections arranged in the peculiar manner recited to attain substantially the beneficial results sought after by this improvement, yet to realize the full benefit of rigidity and strength in a ventilated barrel I construct the same of two circular series of lapping stave-sections, one series of which is composed of stave-sections arranged alongside of each other and gradually decreasing in width from one end toward the other and arranged with the wide end of one stave-section next to the narrow ends of adjacent stave-sections. A barrel having the lapping double series of stave-sections arranged with the stave-sections of one series in the order recited imparts to the barrel substantially the effect and strength of having been made in one piece and at the same time attains the ventilating features essential to a barrel of this class and the desirable bilge.

It will be understood that by the term "composite staves" I mean that the staves of one of the two concentric series are imposed upon the staves of the other series, hence becoming "composited" in the process of making the barrel, and that the composite staves do not exist as entities prior to the formation of the barrel, but are created as elements in the barrel when the same is in process of construction.

It will be further understood from the foregoing description and by reference to Figs. 1, 2, and 4 of the drawings that the staves of the two concentric series overlap, the degree to which the staves overlap depending upon and varying with the width of the staves, and that this overlapping quality can be secured in a degree by using one series of my wedge-shaped staves in combination with a series of staves which are not necessarily wedge-shaped.

By the described construction I produce a barrel in which the several staves reinforce each other, in which the ventilation desired in truck-barrels is attained, and in which the greatest possible strength in a ventilated barrel is secured without any loss of material.

Having thus described my invention, what I claim, and desire to secure by Letters Patent, is—

1. A barrel comprising wedge-shaped staves arranged in pairs face to face alongside each other and reversed end to end whereby the narrow end of each stave lies next to the wide end of the adjacent stave substantially as set forth.

2. A barrel having a circular series of stave-sections arranged edgewise alongside each other and gradually decreasing in width from one end toward the other and arranged with the wide end of one stave next to the narrow ends of the adjacent staves the series extending throughout the circle of the barrel whereby there are provided at the ends of the barrel, circles of alternating wide and narrow stave ends substantially as set forth.

3. A barrel composed of inner and outer circular series of stave-sections, the stave-sections of one series arranged edgewise alongside of each other and gradually decreasing in width from one end toward the other and arranged with the wide end of one stave-section next to the narrow ends of adjacent stave-sections, substantially as set forth.

4. A barrel composed of inner and outer circular series of stave-sections arranged for the stave-sections of one series to have engagement laterally with the stave-sections of the other series, the outer series of stave-sections arranged edgewise alongside of each other and gradually decreasing in width from one end toward the other and arranged with the wide end of one stave-section next to the narrow ends of adjacent stave-sections, substantially as described.

5. A barrel composed of inner and outer circular series of stave-sections, the stave-sections of the inner series arranged alongside of each other and gradually decreasing in width from one end toward the other and arranged with the wide end of one stave-section next to the narrow ends of the adjacent stave-sections, substantially as described.

6. A barrel composed of inner and outer circular series of stave-sections arranged with the stave-sections of one series in lateral engagement with the stave-sections of the other series, the stave-sections of one series being arranged alongside of each other and gradually decreasing in width from one end toward the other and arranged with the wide end of one stave-section next to the narrow ends of the adjacent stave-sections, both series extending throughout the circle of the barrel, whereby there are provided at the ends of the barrel circles of alternating wide and narrow stave ends, substantially as set forth.

7. In a barrel substantially as described a composite stave composed of stave-sections fitted face to face and gradually decreasing in width from one end to the other, the narrow end of one stave lying next to the wide end of the other stave of said composite stave substantially as set forth.

8. A barrel composed of inner and outer series of stave-sections made wedge shape and arranged with the staves of each layer having the wide end of one stave next to the narrow end of the adjacent staves and the staves of the outer layer reversed end to end with respect to the staves of the inner layer which said outer staves overlie substantially as set forth.

9. The improved barrel herein described composed of inner and outer layers of stave-sections, each section being made wider at one end and decreasing in width toward its opposite end and the stave-sections of each layer being arranged edgewise with the wide end of one next to the narrow end of the adjacent sections and the stave-sections of the outer layer being reversed end to end with respect to the section of the inner layer which it overlies, and the end and quarter hoops all substantially as and for the purposes set forth.

10. A barrel having one series of wedge-shaped staves, arranged in reverse relation to each other, with the broad end of one stave next to the narrow end of the next in series, in combination with a series of staves, the end portions of which overlap the end portions of such wedge-shaped staves, substantially as described.

11. A barrel composed of two concentric series of staves, one of said circular series comprising wedge-shaped sections arranged edgewise alongside each other and gradually decreasing in width from one end toward the other and arranged with the wide end of one stave of one series next to the narrow ends of the adjacent staves in the same series whereby there are provided at the ends of the barrel circles of alternating wide and narrow stave ends, substantially as described.

In testimony that I claim the foregoing as my own I have hereto affixed my signature in the presence of two witnesses.

ROBERT TATEM HARGROVES.

Witnesses:
P. PAUL PEEBLES,
LOUIS C. PHILLIPS.